US009115470B2

(12) United States Patent
Musick et al.

(10) Patent No.: US 9,115,470 B2
(45) Date of Patent: Aug. 25, 2015

(54) TREATED INORGANIC PIGMENTS HAVING REDUCED PHOTOACTIVITY AND ANTI-MICROBIAL PROPERTIES AND THEIR USE IN PAPER SLURRIES

(75) Inventors: Charles David Musick, Waverly, TN (US); Peter Jernakoff, Wilmington, DE (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 53 days.

(21) Appl. No.: 14/126,502

(22) PCT Filed: Jun. 20, 2012

(86) PCT No.: PCT/US2012/043253
§ 371 (c)(1),
(2), (4) Date: Dec. 16, 2013

(87) PCT Pub. No.: WO2013/003142
PCT Pub. Date: Jan. 3, 2013

(65) Prior Publication Data
US 2014/0134427 A1 May 15, 2014

Related U.S. Application Data

(60) Provisional application No. 61/501,805, filed on Jun. 28, 2011.

(51) Int. Cl.
| D21H 21/28 | (2006.01) |
| D21H 27/26 | (2006.01) |
| B44C 5/04 | (2006.01) |
| D21H 17/63 | (2006.01) |
| D21H 17/69 | (2006.01) |
| D21H 21/36 | (2006.01) |
| D21H 27/18 | (2006.01) |
| B32B 29/00 | (2006.01) |
| D21H 17/66 | (2006.01) |
| D21H 17/67 | (2006.01) |
| D21H 17/68 | (2006.01) |

(52) U.S. Cl.
CPC ............ *D21H 5/0085* (2013.01); *B32B 29/002* (2013.01); *B44C 5/0469* (2013.01); *D21H 17/63* (2013.01); *D21H 17/69* (2013.01); *D21H 21/28* (2013.01); *D21H 21/36* (2013.01); *D21H 27/18* (2013.01); *B32B 2260/028* (2013.01); *B32B 2260/046* (2013.01); *B32B 2451/00* (2013.01); *D21H 17/66* (2013.01); *D21H 17/675* (2013.01); *D21H 17/68* (2013.01); *Y10T 428/257* (2015.01)

(58) Field of Classification Search
CPC ..... D21H 21/28; D21H 5/0085; D21H 17/63; D21H 17/66; D21H 17/675; D21H 17/68; D21H 17/69; D21H 21/36; D21H 27/18; B32B 29/002; B32B 2260/028; B32B 2260/046; B32B 2451/00; Y10T 428/257; B44C 5/0469

USPC .............................. 428/329; 162/181.5, 164.6
See application file for complete search history.

(56) References Cited

U.S. PATENT DOCUMENTS

| 3,528,837 A | 9/1970 | Sheehan |
| 3,640,743 A * | 2/1972 | Sheehan ..................... 106/428 |
| RE30,233 E | 3/1980 | Lane et al. |
| 4,239,548 A | 12/1980 | Barnard et al. |
| 4,599,124 A | 7/1986 | Kelly et al. |
| 4,689,102 A | 8/1987 | Prawdzik et al. |
| 5,180,585 A * | 1/1993 | Jacobson et al. .............. 424/405 |
| 5,425,986 A | 6/1995 | Guyette |
| 5,679,219 A | 10/1997 | Harms et al. |
| 6,287,681 B1 | 9/2001 | Mehta et al. |
| 6,290,815 B1 | 9/2001 | Magnin et al. |
| 6,413,618 B1 | 7/2002 | Parker et al. |
| 6,551,455 B2 | 4/2003 | Johnson et al. |
| 6,706,372 B2 | 3/2004 | Schulz et al. |
| 6,709,764 B1 | 3/2004 | Perrin et al. |
| 6,761,979 B2 | 7/2004 | Yokochi et al. |
| 6,783,631 B2 | 8/2004 | Schulz |
| 7,029,648 B2 | 4/2006 | Subramanian |
| 2003/0138600 A1 | 7/2003 | Dohring et al. |
| 2006/0204456 A1 | 9/2006 | Asakura |

FOREIGN PATENT DOCUMENTS

| EP | 450805 | 10/1994 |
| EP | 1674517 | * 6/2006 |
| EP | 1 925 644 | 5/2008 |
| FI | 53133 | 10/1977 |
| FR | 2 773 180 | 7/1999 |
| GB | 1459025 | 12/1976 |
| GB | 2242679 | 10/1991 |
| JP | 05310999 | 11/1993 |

(Continued)

OTHER PUBLICATIONS

EP International Search Report, PCT/US2012/043233, Dated Sep. 12, 2012.
EP International Search Report, PCT/US2012/043253, Dated Sep. 13, 2012.
H.B. Clark, 'Titanium Dioxide Pigments', Treatise on Coatings vol. 3, Pigments Marcel Dekker 1975 (Book Not Included).
Ermolaeva, Lakokrasochnye Materialy, Modification of Rutile Type TI02 by A1, SI and TI Compounds in Order to Improbe Its Physical Technological Properties, 1965, vol. 4, pp. 13-18.
Ermolaeva et al., Kolloidnyli Journal, Adsorption and Pigmentation Properties of TI02 With a Modified Surface. Pigmented Rutile Modified by a Mixture of A1 and SI Oxides by the Wet Method, vol. 28 (3), pp. 380-387.
Guzairova, Prikladnoi Khimii Journal, Composition of Modifying Coatings on Pigment Titanium Dioxide, 1987, vol. 60, pp. 1105-1110.

*Primary Examiner* — Leszek Kiliman

(57) ABSTRACT

The disclosure provides a paper slurry comprising a treated inorganic particle having reduced photoactivity and improved anti-microbial properties, wherein the treated inorganic pigment comprises: an inorganic core particle; a first treatment of a silicon compound, wherein the silicon compound is added in a single step; and a second treatment comprising a co-precipitated zinc oxide and alumina.

20 Claims, No Drawings

(56) References Cited

FOREIGN PATENT DOCUMENTS

| NL | 6503529 | 9/1965 |
|---|---|---|
| RU | 2162869 | 2/2001 |
| SU | 854966 | 8/1981 |
| SU | 1640136 | 4/1991 |
| WO | 95/10940 | 4/1995 |
| WO | WO95/10940 * | 4/1995 |
| WO | 03/011981 | 2/2003 |
| WO | 2007 003697 | 1/2007 |

* cited by examiner

TREATED INORGANIC PIGMENTS HAVING REDUCED PHOTOACTIVITY AND ANTI-MICROBIAL PROPERTIES AND THEIR USE IN PAPER SLURRIES

BACKGROUND OF THE DISCLOSURE

1. Field of Disclosure

This disclosure relates to an inorganic oxide pigment, and in particular to titanium dioxide pigment, $TiO_2$, suitable for use in paper slurries.

2. Description of the Related Art

Titanium dioxide pigments are used in many applications. One particular application demanding light fastness is the use in paper incorporated into paper laminates for decorative applications.

Paper laminates are in general well-known in the art, being suitable for a variety of uses including table and desk tops, countertops, wall panels, floor surfacing, tableware, outdoor applications, and the like. Paper laminates have such a wide variety of uses because they can be made to be extremely durable, and can be also made to resemble (both in appearance and texture) a wide variety of construction materials, including wood, stone, marble and tile, and can be decorated to carry images and colors.

Typically, the paper laminates are made from papers by impregnating the papers with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the laminate.

Decorative paper laminates can be made by utilizing a decorated paper layer as upper paper layer in the unitary core structure. The remainder of the core structure typically comprises various support paper layers, and may include one or more highly-opaque intermediate layers between the decorative and support layers so that the appearance of the support layers does not adversely impact the appearance of decorative layer.

Paper laminates may be produced by both low- and high-pressure lamination processes.

Various methods can be employed to provide paper laminates by low-pressure lamination. For example, a single opening, quick cycle press can be used where one or more resin-saturated paper sheets are laminated to a sheet of plywood, particle board, or fiberboard. A "continuous laminator" can be used where one or more layers of the resin-saturated paper are pressed into a unitary structure as the layers move through continuous laminating equipment between plates, rollers or belts. Alternatively, a laminated sheet (continuous web or cut to size) may be pressed onto a particle or fiberboard, etc. and a "glue line" used to bond the laminated sheet to the board. Single or multiple opening presses may also be employed which contain several laminates.

In making paper laminates via high-pressure lamination, a plurality of sheets are impregnated with a thermosetting resin and stacked in superimposed relation, optionally with a decorative sheet placed on top. This assembly is then heat and pressure consolidated at pressures of at least about 500 psi. Generally, more than one laminate is formed at one time by inserting a plurality of sheet assemblies in a stack with each assembly being separated by a release medium which allows the individual laminates to be separated after heat and pressure consolidation. The laminates so formed are then bonded to a substrate, such as plywood, hardboard, particle board, fiberboard, composites and the like, by the use of adhesives such as contact adhesives, urea-formaldehyde, white glues (polyvinyl acetate emulsions), hot melts, phenolic or resorcinol formaldehyde, epoxy, coal tar, animal glues and the like.

It has been found desirable during the production of such laminates, by either low- or high-pressure lamination processes, to impart abrasion-resistant characteristics to the decorative surface portion of the laminate to enhance the utility of such laminates in end-use applications such as table and countertops, wall panels and floor surfacing. Such abrasion resistance can, for example, be imparted to paper laminates by means of an applied overlay sheet that provides a barrier over the print sheet. If the print sheet is decorative, the overlay should be substantially transparent. Abrasion-resistant resin coatings have also been applied to the surface of the laminate.

It has also been found desirable to impart moisture barrier properties to the base of such paper laminates, which can be done by bonding a moisture-barrier layer to the base of the laminate.

Examples of such paper laminates may be found, for example, in U.S. Pat. No. RE 30,233, U.S. Pat. No. 4,239,548, U.S. Pat. No. 4,599,124, U.S. Pat. No. 4,689,102, U.S. Pat. No. 5,425,986, U.S. Pat. No. 5,679,219, U.S. Pat. No. 6,287,681, U.S. Pat. No. 6,290,815, U.S. Pat. No. 6,413,618, U.S. Pat. No. 6,551,455, U.S. Pat. No. 6,706,372, U.S. Pat. No. 6,709,764, U.S. Pat. No. 6,761,979, U.S. Pat. No. 6,783,631 and US2003/0138600, the disclosures of which are incorporated by reference herein for all purposes as if fully set forth.

The papers in such paper laminates generally comprise a resin-impregnated, cellulose pulp-based sheet, with the pulp being based predominantly on hardwoods such as eucalyptus, sometimes in combination with minor amounts of softwood pulps. Pigments (such as titanium dioxide) and fillers are added in amounts generally up to and including about 45 wt % (based on the total dry weight prior to resin impregnation) to obtain the required opacity. Other additives such as wet-strength, retention, sizing (internal and surface) and fixing agents may also be added as required to achieve the desired end properties of the paper. Resins used to impregnate the papers include, for example, diallyl phthalates, epoxide resins, urea formaldehyde resins, urea-acrylic acid ester copolyesters, melamine formaldehyde resins, melamine phenol formaldehyde resins, phenol formaldehyde resins, poly (meth)acrylates and/or unsaturated polyester resins.

Examples of papers used in paper laminates may be found in U.S. Pat. No. 6,599,592 (the disclosure of which is incorporated by reference herein for all purposes as if fully set forth) and the above-incorporated references, including but not limited to U.S. Pat. No. 5,679,219, U.S. Pat. No. 6,706, 372 and U.S. Pat. No. 6,783,631.

As indicated above, the paper typically comprises a number of components including, for example, various pigments, retention agents and wet-strength agents. The pigments, for example, impart desired properties such as opacity and whiteness to the final paper, and a commonly used pigment is titanium dioxide that is, in a relative sense, expensive in nature. Retention aids are added in order to minimize losses of titanium dioxide and other fine components during the papermaking process, which adds cost, as do the use of other additives such as wet-strength agents.

Inorganic pigments may be added to the paper slurries. In particular, titanium dioxide pigments have been added to paper slurries for imparting whiteness and/or opacity to the finished article. To deliver other properties to the paper slurries, additional additives are incorporated into the paper slurries during the processing step. What is needed is a titanium dioxide that has multiple properties associated with it.

A need exists for a process for the addition of silica, aluminum and zinc to the titanium dioxide pigments that provides property improvements needed for making improved paper laminates.

SUMMARY OF THE DISCLOSURE

In a first aspect, this disclosure provides a paper slurry comprising a treated inorganic particle, typically an inorganic pigment particle, and more typically a titanium dioxide particle, having reduced photoactivity and improved anti-microbial properties, wherein the treated inorganic particle, typically an inorganic pigment particle, and more typically a titanium dioxide particle, comprises:

(a) an inorganic core particle, typically titanium dioxide;
(b) a first treatment of a silicon compound, such as silica, wherein the silicon compound is added in a single step; and
(c) a second treatment comprising a co-precipitated zinc oxide and alumina.

By "co-precipitated" we mean the simultaneous or substantially simultaneous precipitation of zinc oxide and alumina.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content clearly dictates otherwise. Thus, for example, reference to "TiO$_2$ particle", "the TiO$_2$ particle", or "a TiO$_2$ particle" also includes a plurality of TiO$_2$ particles.

This disclosure relates to novel pigment compositions comprising inert inorganic particles, typically titanium dioxide particles, having a first treatment of a silicon compound such as silicon dioxide or silica, zinc silicates or borosilicates, more typically silicon dioxide, and a second treatment of zinc oxide and aluminum oxide that may be used in paints, coatings, caulks, grouts, cements and masonry products and shaped polymeric articles including, but not limited to, films, membranes, fibers, and mono-filaments including but not limited to mono-filaments for brushes. In many applications, the compositions of this disclosure can be used to replace all or part of fillers and/or pigments normally used in the product. For example, if TiO$_2$ is selected as the core material, then the resulting particle, when incorporated into a fiber, will deluster the fiber and may also confer anti-microbial activity. The compositions of this disclosure are particularly useful when incorporated in a polymer carrier matrix composite. The physical properties of such composites are similar to those of the polymers themselves.

The inert inorganic particles may be oxides of titanium, aluminum, zinc, copper, iron; the sulfates of calcium, strontium, barium; zinc sulfide; copper sulfide, zeolites; mica; talc; kaolin, mullite, calcium carbonate, or silica. Lead or mercury compound are contemplated equivalent core materials but may be undesirable due to their toxicity. More typical core materials are titanium dioxide, TiO$_2$ and barium sulfate, and most typically titanium dioxide, TiO$_2$.

In a specific embodiment, the TiO$_2$ can be prepared by any of several well-known methods including high temperature vapor phase oxidation of titanium tetrachloride, vapor phase hydrolysis of titanium tetrachloride, hydrolysis of colloidally seeded sulfuric acid solutions of titaniferous raw materials such as ilmenite, and the like. Such processes are well-known in the prior art.

Because the pigment of this disclosure is to be used in applications requiring high light scattering, the size of the initial titanium dioxide core particles should typically be less than one micron, with the average typically falling between 0.15 and 0.25 micron.

Treatments to be applied by the process of this disclosure to the core particles of titanium dioxide are applied by precipitation in aqueous slurries of the core titanium dioxide particles.

The treatments applied to the core particles in accordance with this disclosure are either porous or dense. The first treatment is with a silicon compound that may be silica or silicon dioxide, zinc silicate, or borosilicate. Silica is typically used because of the ease with which dense, uniform coatings may be obtained. It is applied from a solution of sodium silicate using techniques known to one skilled in the art. To obtain a dense silica treatment, a temperature above 50 C is typical and more typically above 70 C. The treatment corresponds to about 0.5 to about 20% by weight, more typically about 1 to about 7%, based on the total weight of the titanium dioxide core particle. Silica-coated particles may have a low isoelectric point and may tend to be difficult to disperse in organic materials. The isoelectric point represents the pH at which a particle surface carries zero electric charge. Control of the isoelectric point between 5.5 and 9.5 can be beneficial in facilitating the dispersion and/or flocculation of the particulate compositions during plant processing and in their end use applications.

The amount of silica added in a wet treatment process will often affect the acid solubility of the pigment produced by encapsulating the TiO$_2$ particles. A well encapsulated TiO$_2$ particle will not be dissolved by a strong acid in the acid solubility test. A higher silica level will typically produce a TiO$_2$ product lower in acid solubility. While helpful for reducing acid solubility, the additional silica will typically have negative impacts on gloss, particle size and cost. It is known to add materials to the silica precipitation to improve the uniformity of the coverage of the silica on the TiO$_2$ particle. Borosilicate and zinc silicate are two examples of modifying the silica treatment to improve uniformity of the coverage.

An alternate method of adding a silica coating to the TiO$_2$ particle is a pyrogenic deposition disclosed in U.S. Pat. No. 7,029,648 which is incorporated herein by reference.

The second treatment comprises zinc oxide and aluminum oxide. These treatments are typically porous, applied from a solution of soluble aluminate and a zinc salt using techniques known to one skilled in the art. The pH of the solution during the aluminate treatment will typically range from 3 to 10 at a temperature from 10 C to 90 C. The treatment corresponds to about 0.5 to about 20% by weight, more typically about 1 to about 5%, based on the total weight of the titanium dioxide core particle. Less than about 0.5% can cause poor dispersibility of the pigment in paint formulations and an amount of porous treatment greater than about 20% can cause gloss degradation.

The porous treatment consists essentially of alumina and is obtained by precipitating a soluble aluminate in the presence of the core particles. By "soluble aluminate" is meant alkali metal salts of aluminate anions, for example, sodium or potassium aluminate. The soluble aluminates are generally dissolved at a pH of greater than 10 and are precipitated at a pH of less than 10 and preferably 7.5 to 9.5. Because substantially all of the alumina that is precipitated finds its way to a treatment on the core particles, it typically is only necessary to provide that amount of soluble aluminate to the slurry liquid which will result, after precipitation, in the appropriate degree of treatment.

The alumina may also be a dense treatment. The alumina for the dense treatment is obtained from a cationic source of alumina. The term "cationic source of alumina" refers to aluminum compounds that dissolve in water to yield an acidic solution. Examples include aluminum sulfate, aluminum chloride, aluminum fluoride, basic aluminum chloride, and the like.

The second treatment also comprises a co-precipitation of zinc oxide during the alumina treatment step. This treatment is a porous treatment and is applied from a solution of a zinc salt at a temperature of 10 C to 90 C, and more typically at 25 C to 80 C. The zinc oxide treatment is typically applied with the alumina treatment from a mixture of zinc chloride or zinc sulfate. The zinc oxide treatment is present in the amount of about 0.3% to about 5% by weight, more typically about 0.5% to about 3%, based on the total weight of the titanium dioxide core particle. An amount of porous treatment greater than about 3% ZnO can cause gloss degradation in a paint formulation; however, the loss of gloss will not hurt a product designed for the laminate industry.

The process for forming a treated inorganic particle, more typically a titanium dioxide particle, having reduced photoactivity, reduced acid solubility and improved anti-microbial properties comprises:
  (a) forming an aqueous suspension of inorganic particles, more typically titanium dioxide particles;
  (b) depositing a first treatment of silicon compound, such as silica, on the core inorganic oxide particles, more typically titanium dioxide particles, wherein the silicon compound is added in a single step;
  (c) depositing a second treatment over the first treatment, said second treatment comprising co-precipitated zinc oxide and alumina; and
  (d) recovering the solids, washing free from water soluble species and drying. This process further comprises micronizing the dried particles.

The co-precipitated zinc oxide and alumina are prepared from a zinc salt and an alkaline metal aluminate.

Typically, the silicon addition in step (b) occurs as a wet precipitation at a pH between 4 and 10, more typically between 7 and and at a temperature between 50 C and 100 C, and more typically between 70 C and 90 C. Alternately, the silica is deposited pyrogenically as part of the high temperature vapor phase oxidation of $TiCl_4$.

Typically, the zinc oxide and alumina co-precipitation in step (c) occurs at a temperature between 10 C and 90 C, and more typically between 30 C and 80 C, and most typically between 50 C and 75 C.

After the treatments in accordance with this disclosure, the pigment is recovered by known procedures including filtration, washing, drying, sieving, and dry grinding such as micronizing.

Paper Slurries

The present disclosure provides a titanium dioxide pigment for use in making paper laminates. In the process of making paper laminates, laminate papers are made which usually contain titanium dioxide as an agent to enhance paper opacity and brightness. The titanium dioxide may be first blended with water and the pH is controlled to form a slurry. This slurry may be then added to the blend of water and raw materials (pulp, pigments, chemicals, fillers, etc) on the paper machine which is eventually converted into dry paper.

In this disclosure, in addition to the treatments described above, the titanium dioxide pigment may be treated with oxides of metals such as phosphorus, etc. A source of phosphorus is typically phosphoric acid. However, the pigment can be treated with any suitable source of phosphorus such as salts of tetrapyrophosphate, salts of hexametaphosphate, and salts of tripolyphosphate. The pigment surface treatment of the present disclosure may range in composition from about 2.0 to about 4% by weight P reported as $P_2O_5$. More typical is a composition from about 2.5 to about 3.2% by weight P reported as $P_2O_5$.

The pigment of this disclosure may comprise an isoelectric point from pH about 5.4 to about 6.7, and a zeta potential at pH=9.0 of less than about negative 40 mV, typically from about negative 40 mV to about negative 50 mV.

The pigment of this disclosure may be characterized by its light fastness in a laminate structure. Light fastness is the ability of the pigment, incorporated into a laminate, to resist significant color change upon prolonged exposure to ultraviolet light.

Light fastness of a laminated panel constructed from décor paper is a highly desired property widely shared among laminate panel producers. Simply stated, light fastness refers to the resistance of a laminate panel to change color, or "photogrey", upon prolonged exposure to light, Methods used to impart light fastness to a titanium dioxide pigment include both thermal and chemical treatments. Light stable pigment can exhibit improved light fastness corresponding to a decrease in delta E* (color change) of at least about 40% compared to non-treated pigment grades.

Using a thermal approach to light fastness, it is critical to maintain time at a specific minimum temperature to get the desired level of light fastness. The thermal treatment may be thus controlled by equipment such as a heated pneumatic conveyer, rotating kiln or any such environment that achieves the same effect known to one skilled in the art. In the context of the described invention, using a thermal route to light fastness would necessarily precede application of the organic treatment in order to avoid the temperatures and conditions that would likely promote the undesired combustion/oxidation of organic treatment, resulting in detrimental properties like pigment yellowing, in combination with destruction of the organic treating agent.

In addition to light fastness, it has also been found that the thermally treated pigments of this disclosure largely retain their brightness, as determined by comparing L* (a component of the widely used CIE L*a*b* color measurement system) of white laminates made with the treated and the untreated pigment.

The chemical route to light fastness has proven to be more economical compared to the described thermal process. Using this approach, wet filter cake can be treated by a variety of nitrate-containing inorganic salts, such as aluminum, sodium, or ammonium nitrate. Thus light fastness may be imparted at a point in the production process preceding or concurrent with application of the organic treatment, avoiding the necessary time penalty and energy costs associated with the heat-up and cool-down cycles of the thermal treatment approach.

The pigment from this process may typically be water dispersible requiring no addition other than pH adjustment in order to form stable slurries comprising up to 80% solids and exhibiting excellent light fastness according to methods used in assessing properties of decor papers and paper laminates. The method of making the decor papers or paper laminates is not critical in the performance of the pigment of the present disclosure.

In the typical high pressure laminates of the disclosure, the laminates are produced by pressing together several impregnated layered papers. The structure of these molded laminated materials consists in general of a transparent layer (overlay) which produces an extremely high surface stability, a decorative paper impregnated with a synthetic resin and one or more kraft papers impregnated with a phenolic resin. Molded fiber board and particle board or plywood can be used as the substrate.

The decorative base paper contains a pigment mixture of the treated titanium dioxide pigment of this disclosure. The amount of titanium dioxide in the pigment mixture can be up to 55 wt. %, in particular from about 5 to about 50 wt. % or from 20 to about 45 wt. %, based on the weight of the paper. The pigment mixture may contain fillers such as zinc sulfide, calcium carbonate, kaolin or mixtures thereof.

Softwood pulp (long-fiber pulp) or hardwood pulp (short-fiber pulp) or a combination thereof may be used as the cellulose pulp for producing the decorative bulk paper.

Wet strength resins well known in the art of laminate papermaking may also be used.

The decorative bulk paper can be produced on typical equipment well known in the art of laminate papermaking by the high-pressure process.

The decorative base paper can be impregnated with the conventional synthetic resin dispersion, typically an aqueous dispersion of melamine-formaldehyde resin. The amount of resin introduced into the decorative base paper by impregnation can range from 25 to 30% based on the weight of the paper.

After drying the impregnated paper can also be coated and printed and then applied to a substrate such as a wooden board.

In the examples which follow, the descriptions of illustrative and typical embodiments of the present disclosure are not intended to limit the scope of the disclosure. Various modifications, alternative constructions and equivalents may be employed without departing from the true spirit and scope of the appended claims. In one embodiment, the paper slurries may be substantially free of other conventional colorants and contain solely the treated titanium dioxide pigments of this disclosure.

Test Methods:
In the examples which follow, the test results were obtained by the procedures described below.

TFW-182 Paint
TFW-182 paint was produced by preparing an emulsion paint formulation using a slurry sample produced from 76.5% $TiO_2$ solids in water. 100 grams of emulsion gloss masterbatch based on acrylic emulsion resin (Primal AC-388 from Rohm & Haas, a subsidiary of Dow Chemicals, Midland, Mich.) (27% Pigment Volume Concentration) should be used. The paint was produced by mixing 100 grams of masterbatch, 40.3 grams of slurry, and 0.7 grams of water.

72 Hour Laminate Light Stability
72 Hour Laminate Light Stability is determined by measuring the color change in a melamine containing paper laminate coupon when exposed to UV light.

A small sample of $TiO_2$ (6.0 grams) is mixed with 60 grams of a 50% water/50% BLTM-817 (or BLTM 806) Melamine Formaldehyde Resin, manufacturer: BTL of Ohio, Toledo, Ohio, and the mixture is mixed in an Osterizer at high speed for a total of 2 minutes. A 1½"×7" filter paper strip is placed in the solution to become completely saturated. Excess solution is removed by drawing both sides of the paper strip across a glass rod. The impregnated paper strips are allowed to dry for 10 to 20 minutes and then placed in a 110 C oven for 15 minutes. The impregnated strips are then constructed into a laminated containing the following layers for fabrication: 1) Blotter, 2) Caul Plate 3) Overlay, 4) Top impregnated filter strip, 5) Bottom impregnated filter strip, 6) White sheet, 7) 3 sheets Kraft core stock, 8) White Sheet, 9) Overlay, 10) Caul plate, 11) Blotter. The constructed laminate is place in the preheated Carver press for 6 minutes at 300 F under 1000 psi of pressure. The color of this strip is measured via a Hunter Labscan for L*a*b*. The test strips are place in a weathering machine with UV irradiance intensity set at 1.1 W/m2 at 420 nm. The Black panel temperature is set to 63 C. The strip is exposed for 72 hours. Within 15 minutes of completing exposure, the L*a*b* is measured again. The 72 hour laminate light stability is measured as delta E*, Delta E* is calculated as follows:

$$\text{Delta } E^* = \text{Square Root}((\text{Delta } L^*)^2 + (\text{Delta } a^*)^2 + (\text{Delta } b^*)^2)$$

Typically, the pigment particle has a light stability of less than about 8, more typically less than 6, and for a lightfast laminate a typical light stability is less than 2.4.

EXAMPLES

The disclosure will be better understood with reference to the following illustrative examples. Properties of the pigments prepared as in the examples, and those of several commercial pigments, for comparison, are shown in the Tables. All percentages are on a weight basis.

Comparative Example 1

Five gallons of $TiO_2$ slurry at ~325 grams per liter concentration were added to a small stirred tank. The pH was adjusted to 9.5 using 20% caustic. The slurry was heated to 90 C. Sodium silicate solution was added to the small stirred tank over a period of 30 minutes in an amount sufficient to add 4.3% $SiO_2$ while the pH was maintained at 9.5 with the simultaneous addition of dilute hydrochloric acid. The material was stirred for 30 minutes. The slurry was cooled to 75 C with time and ice. The pH was lowered to 8.2 using hydrochloric acid. Sodium aluminate solution was added to the small stirred tank over a period of 60 minutes in an amount sufficient to add 1.2% Al2O3 while the pH was held at 8.2 with simultaneous addition of dilute HCl. The material was stirred for 30 minutes. The material was filtered, dried, screened and micronized. 72-hour laminate light stability was measured on the pigment.

Example 1

Comparative Example 1 was repeated with the following exception: Simultaneously with the addition of the sodium aluminate solution, a zinc chloride solution was added at an amount sufficient to add 1.5% ZnO. Results are shown in Table 1.

Example 2

Example 1 was repeated with the following exception; zinc chloride solution was added at an amount sufficient to add 2.1% ZnO. Results are shown in Table 1.

Example 3

Example 1 was repeated with the following exception: zinc chloride solution was added at an amount sufficient to add 3.6% ZnO. Results are shown in Table 1.

Results for Comparative Example 1 and Examples 1-3

72-hour laminate light stability were measured on the four pigments produced above with the following results.

TABLE 1

| Example | % ZnO | 72-Hour Laminate Light Stability (ΔE*) |
|---|---|---|
| C1 | 0 | 3.61 |
| 1 | 1.5 | 2.46 |
| 2 | 2.1 | 2.24 |
| 3 | 3.6 | 1.76 |

Comparative Example 2

Comparative Example 1 was repeated with the following exceptions: Sodium silicate solution was added in an amount sufficient to add 3% $SiO_2$. Sodium aluminate solution was added in an amount sufficient to add 1.3% $Al_2O_3$. The pigment was made into a TFW-182 paint formulation. The results are shown in Table 2.

Example 4

Comparative Example 2 was repeated with the following exception: Simultaneously with the addition of the sodium aluminate solution, a zinc chloride solution was added at an amount sufficient to add 1.6% ZnO. The results are shown in Table 2.

Example 5

Example 4 was repeated with the following exception: zinc chloride solution was added at an amount sufficient to add 2.3% ZnO. The results are shown in Table 2.

Example 6

Example 5 was repeated with the following exception: zinc chloride solution was added at an amount sufficient to add 3.6% ZnO. The results are shown in Table 2.

Results for Comparative Example 2 and Examples 4-6

The paints produced in the four examples above were painted onto boards and given external North facing exposure to enhance mildew growth. Digital images of the boards were taken after 18 months of exposure and analyzed for discoloration using a Hunter Labscan to measure whiteness (L*) as a proxy for discoloration due to mildew growth (decreased L* with time equates to increased mildew growth). The data showed that the L* of the sample produced in the comparative example was statistically lower than the L* of the three sample with zinc co-precipitated with the alumina.

TABLE 2

| Example | % ZnO | Average L* |
|---|---|---|
| C2 | 0 | 71.9 |
| 4 | 1.5 | 75.5 |
| 5 | 2.3 | 76.9 |
| 6 | 3.6 | 74.2 |

What is claimed is:

1. A paper slurry comprising a treated inorganic particle having reduced photoactivity and improved anti-microbial properties, wherein the treated inorganic particle comprises:
   a. an inorganic core particle;
   b. a first treatment of a silicon compound, wherein the silicon compound is added in a single step; and
   c. a second treatment comprising a co-precipitated zinc oxide and alumina.

2. The paper slurry of claim 1 further comprising paper pulp.

3. The paper slurry of claim 1 wherein the inorganic core particle is ZnS, $TiO_2$, $CaCO_3$, $BaSO_4$, ZnO, $MoS_2$, silica, talc or clay.

4. The paper slurry of claim 3 wherein the inorganic core particle is titanium dioxide.

5. The paper slurry of claim 1 wherein treated inorganic particle is present in the amount of about 30 to about 90% by weight, based on the total weight of the paper slurry.

6. The paper slurry of claim 1 wherein the silicon compound is silica, zinc silicate or borosilicate.

7. The paper slurry of claim 6 wherein the silicon compound is silica.

8. The paper slurry of claim 7 wherein the silica is pyrogenically added silica.

9. The paper slurry of claim 7 wherein the silica is applied using wet treatment.

10. The paper slurry of claim 1 wherein the silicon compound is present in the amount of about 0.5 to about 20% by weight, based on the total weight of the inorganic core particle.

11. The paper slurry of claim 1 wherein the alumina is present in the amount of about 0.05% to about 20% by weight calculated as Al2O3 and based on the total weight of the inorganic core particle.

12. The paper slurry of claim 1 wherein the zinc oxide is present in the amount of about 0.3 to about 5% by weight, based on the total weight of the inorganic core particle.

13. The paper slurry of claim 1 wherein the titanium dioxide particle has a light stability of less than about 2.4.

14. The paper slurry of claim 1 wherein the metal oxide treatment further comprises oxides of phosphorus.

15. A décor paper prepared from a paper slurry, wherein the paper slurry comprises a treated inorganic particle having reduced photoactivity and improved anti-microbial properties, wherein the treated inorganic particle comprises:
   a. an inorganic core particle;
   b. a first treatment of a silicon compound, wherein the silicon compound is added in a single step; and
   c. a second treatment comprising a co-precipitated zinc oxide and alumina.

16. The décor paper of claim 15 further comprising a melamine formaldehyde resin.

17. A laminate comprising a décor paper prepared from a paper slurry, wherein the paper slurry comprises a treated inorganic particle having reduced photoactivity and improved anti-microbial properties, wherein the treated inorganic particle comprises:
   a. an inorganic core particle;
   b. a first treatment of a silicon compound, wherein the silicon compound is added in a single step; and
   c. a second treatment comprising a co-precipitated zinc oxide and alumina.

18. The laminate of claim 17 further comprising a Kraft paper core layer, a backing layer, and a melamine formaldehyde surface overlay.

19. The laminate of claim 18 comprising a ΔE* value of 6 or less after 72 hrs exposure in the referenced light cabinet.

20. The laminate of claim 19 comprising a ΔE* value of 2.4 or less after 72 hrs exposure in the referenced light cabinet.

* * * * *